US011423136B2

(12) United States Patent
Newton

(10) Patent No.: US 11,423,136 B2
(45) Date of Patent: *Aug. 23, 2022

(54) ACCESS CONTROL FOR CONTENT DELIVERY SERVICES

(71) Applicant: Level 3 Communications, LLC, Broomfield, CO (US)

(72) Inventor: Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/159,512

(22) Filed: Jan. 27, 2021

(65) Prior Publication Data

US 2021/0150017 A1  May 20, 2021

Related U.S. Application Data

(60) Continuation of application No. 16/430,359, filed on Jun. 3, 2019, now Pat. No. 10,909,231, which is a
(Continued)

(51) Int. Cl.
*G06F 21/41* (2013.01)
*H04L 9/40* (2022.01)
(Continued)

(52) U.S. Cl.
CPC .............. *G06F 21/41* (2013.01); *G06F 21/45* (2013.01); *G06F 21/6218* (2013.01);
(Continued)

(58) Field of Classification Search
CPC .................................................. G06F 21/41
See application file for complete search history.

(56) References Cited

U.S. PATENT DOCUMENTS 8,365,213 B1    1/2013  Orlowski
8,447,854 B1 *  5/2013  Jasinskyj .............. H04L 67/289
                                                          709/224
(Continued)

FOREIGN PATENT DOCUMENTS

CN       105871878 A    8/2016
WO    WO-2016065186    4/2016

OTHER PUBLICATIONS

International Search Report and Written Opinion of the International Searching Authority, dated Oct. 5, 2018, Int'l Appl No. PCT/US18/039000, Int'l Filing Date Jun. 22, 2018; 23 pgs.
(Continued)

*Primary Examiner* — Bradley W Holder

(57) ABSTRACT

Examples described herein relate to apparatuses and methods for associating a first account with a second account, the first account being hosted by a first server, the second account being hosted by a second server, including but not limited to, authenticating, by the first server, first login credentials associated with the first account, wherein the first login credentials are received from a user device, receiving, by the first server from the user device, second login credentials associated with the second account, sending, by the first server, the second login credentials to the second server for authentication, in response to determining that the second login credentials are authenticated by the second server, associating, by the first server, the first account with the second account, and connecting, by the first server to the second server, to allow the user device to access services commensurate with the second account without prompting the user device for the second login credentials.

19 Claims, 11 Drawing Sheets

Related U.S. Application Data division of application No. 15/710,775, filed on Sep. 20, 2017, now Pat. No. 10,331,875.

(51) Int. Cl.
    *G06F 21/62*     (2013.01)
    *G06F 21/45*     (2013.01)
    *G06F 21/10*     (2013.01)

(52) U.S. Cl.
    CPC .......... *H04L 63/0815* (2013.01); *G06F 21/10* (2013.01); *H04L 63/0884* (2013.01); *H04L 63/102* (2013.01)

(56) References Cited

U.S. PATENT DOCUMENTS

| | | |
|---|---|---|
| 8,812,607 B2 | 8/2014 | Daly |
| 9,264,774 B2 | 2/2016 | Oliver |
| 9,927,944 B1 | 3/2018 | Blew |
| 2002/0007460 A1 | 1/2002 | Azuma |
| 2004/0059913 A1 | 3/2004 | de Jong |
| 2004/0064719 A1 | 4/2004 | de Jong |
| 2004/0083370 A1 | 4/2004 | de Jong |
| 2004/0083391 A1* | 4/2004 | De Jong ............. G06F 21/6218 726/27 |
| 2004/0139207 A1 | 7/2004 | de Jong |
| 2011/0185437 A1* | 7/2011 | Tran ...................... H04L 63/104 726/28 |
| 2015/0026060 A1 | 1/2015 | Krietzman |
| 2015/0188762 A1 | 7/2015 | Hong |
| 2019/0089694 A1 | 3/2019 | Newton |
| 2019/0286808 A1 | 9/2019 | Newton |

OTHER PUBLICATIONS

Ballon, Pieter et al., "Comparing business models for multimedia content distribution platforms", IEEE Proceedings of the Int'l Conference on Mobile Business; Conf. date Jun. 26-27, 2006, 9 pgs.

Pavlovski, Christopher J. et al., "Digital Media and Entertainment Service Delivery Platform", Published in: Proceeding MSC '05 Proceedings of the first ACM international workshop on multimedia service composition; Hilton, Singapore—Nov. 11, 2005; ACM Digital Library, pp. 47-54.

\* cited by examiner

ACCESS CONTROL FOR CONTENT DELIVERY SERVICES

BACKGROUND

Typically, a user who employs services performed by two different servers maintains two different sets of login credentials for logging onto to two different accounts, each hosted by one of the two servers. The servers may perform different functions and may provide different but related services. Illustrating with a non-limiting example pertaining to content delivery services, a traffic managing server (e.g., a Level 3 ® Intelligent Traffic Manager) can perform a Domain Name Servers (DNS)-based routing of wide-area traffic to publicly accessible Internet Protocol (IP) applications, websites, or Content Delivery Networks (CDNs) based on policies configured by the user to optimize performance. A reporting server (e.g., a Level 3 ® Media portal) can provide to the user reporting, monitoring, and management capabilities with respect to services provided by the traffic managing server. In the situation in which the same user has already registered separate accounts on both the servers, identifying the accounts as belonging to the same entity and associating the accounts server-side can be difficult.

BRIEF SUMMARY

Embodiments are provided for associating a first account with a second account. The first account may be hosted by a first server and the second account may be hosted by a second server. In accordance with one aspect, a method includes authenticating, by the first server, first login credentials associated with the first account, wherein the first login credentials are received from a user device, receiving, by the first server from the user device, second login credentials associated with the second account, sending, by the first server, the second login credentials to the second server for authentication, in response to determining that the second login credentials are authenticated by the second server, associating, by the first server, the first account with the second account, and connecting, by the first server to the second server, to allow the user device to access services commensurate with the second account without prompting the user device for the second login credentials.

The method may further include receiving, by the first server from the user device, the first login credentials, and receiving, by the first server from the user device, the second login credentials after the first login credentials are authenticated.

Embodiments further allow determining that the second login credentials are authenticated by the second server by receiving an authentication success message from the second server. The second login credentials may include an account identifier that identifies the second account. Associating the first account with the second account can include storing the account identifier, and storing mapping information that maps the first account to the account identifier.

In some arrangements, the account identifier is at least one of a username, an account name, or an account number.

The method may include connecting to allow the user device to access services commensurate with the second account without prompting the user device for the second login credentials includes sending, by the first server to the second server, an authentication request, wherein the authentication request includes the account identifier and administrative credentials associated with the first server.

The second login credentials may include an account identifier and a password corresponding to the account identifier, and in response to associating the first account with the second account, the first server deletes the password.

The method permits connecting to allow the user device to access services commensurate with the second account without prompting the user device for the second login credentials includes requesting, by the first server to the second server, services commensurate with the second account on behalf of the user device.

Services commensurate with the first account may include analytic services for the services commensurate with the second account. The services commensurate with the first account may be different from the services commensurate with the second account.

The services commensurate with the second account may include content delivery network (CDN) services for a user of the user device. The services commensurate with the first account may include analytics for the user of the user device, wherein the analytics pertain to the CDN services.

In accordance with one aspect, a first server for associating a first account with a second account is provided. Embodiments allow the first account to be hosted by the first server and the second account to be hosted by a second server, wherein the first server includes a network device, a memory, and a processor configured to authenticate first login credentials associated with the first account, wherein the first login credentials are received from a user device, receive from the user device second login credentials associated with the second account, send the second login credentials to the second server for authentication, in response to determining that the second login credentials are authenticated by the second server, associate the first account with the second account, and connect to the second server to allow the user device to access services commensurate with the second account without prompting the user device for the second login credentials.

In accordance with another aspect, a non-transitory computer-readable medium is provided that includes computer-readable instructions such that, when executed, cause a processor of a first server to authenticate first login credentials associated with a first account, wherein the first login credentials are received from a user device, receive from the user device second login credentials associated with a second account, send the second login credentials to a second server for authentication, in response to determining that the second login credentials are authenticated by the second server, associate the first account with the second account, and connect to the second server to allow the user device to access services commensurate with the second account without prompting the user device for the second login credentials.

In yet another aspect, a method is provided for associating a first account with a second account, the first account being hosted by a first server, the second account being hosted by a second server, the method includes receiving, by the second server, an authentication request from the first server relative to second login credentials associated with the second account, authenticating, by the second server, the second login credentials, flagging, by the second server, the second account, and authorizing access, by the second server, to the second account in response to receiving an account identifier identifying the second account and administrator's credentials associated with the first server.

The method may further includes receiving, by the second server, a second authentication request from a device other than the first server to access the second account after the second account has been flagged; and denying the second authentication request.

The method may further includes receiving, by the second server, an authentication request from a user device after flagging the second account, wherein the authentication request includes the second login credentials, and denying the authentication request.

The access to the second account may be authorized to a user device to allow the user device to access services commensurate with the second account. Authorizing access to the second account can include determining that the second account is flagged.

Services commensurate with the second account may include CDN services for a user of the user device.

In accordance with another aspect, a second server is provided for associating a first account with a second account, the first account being hosted by a first server, the second account being hosted by the second server, the second server includes a network device, a memory, and a processor configured to receive an authentication request from the first server relative to second login credentials associated with the second account, authenticate the second login credentials, flag the second account, and authorize access to the second account in response to receiving an account identifier identifying the second account and administrator's credentials associated with the first server.

In accordance with yet another aspect, a non-transitory computer-readable medium is provided that includes computer-readable instructions for associating a first account with a second account, the first account being hosted by a first server, the second account being hosted by a second server, when executed, cause a processor of the second server to receive an authentication request from the first server relative to second login credentials associated with the second account, authenticate the second login credentials, flag the second account, and authorize access to the second account in response to receiving an account identifier identifying the second account and administrator's credentials associated with the first server.

Other embodiments are directed to systems, devices, and computer readable media associated with methods described herein.

These and other features, together with the organization and manner of operation thereof, will become apparent from the following detailed description when taken in conjunction with the accompanying drawings.

DETAILED DESCRIPTION

Arrangements described herein relate to systems, apparatuses, and methods for associating a first account managed by a first server with a second account managed by a second server, to provide a single sign-on scheme for accessing services provided by both the first server and the second server. The services provided by the first server are commensurate with the scope of access defined by the first account. The services provided by the second server are commensurate with the scope of access defined by the second account. Arrangements described herein allow a user to access the services provided by both the first server and the second server by inputting login credentials (e.g., a username, password, biometrics, and the like) for the first account, instead of using separate sets of login credentials for the first server and the second server. As such, the user who has already registered accounts with both the first server and the second server needs to only maintain one set of login credentials (e.g., the login credentials for the first account) to access services commensurate with both the first account and the second account. A single-login system is thusly provided.

Figure 1:
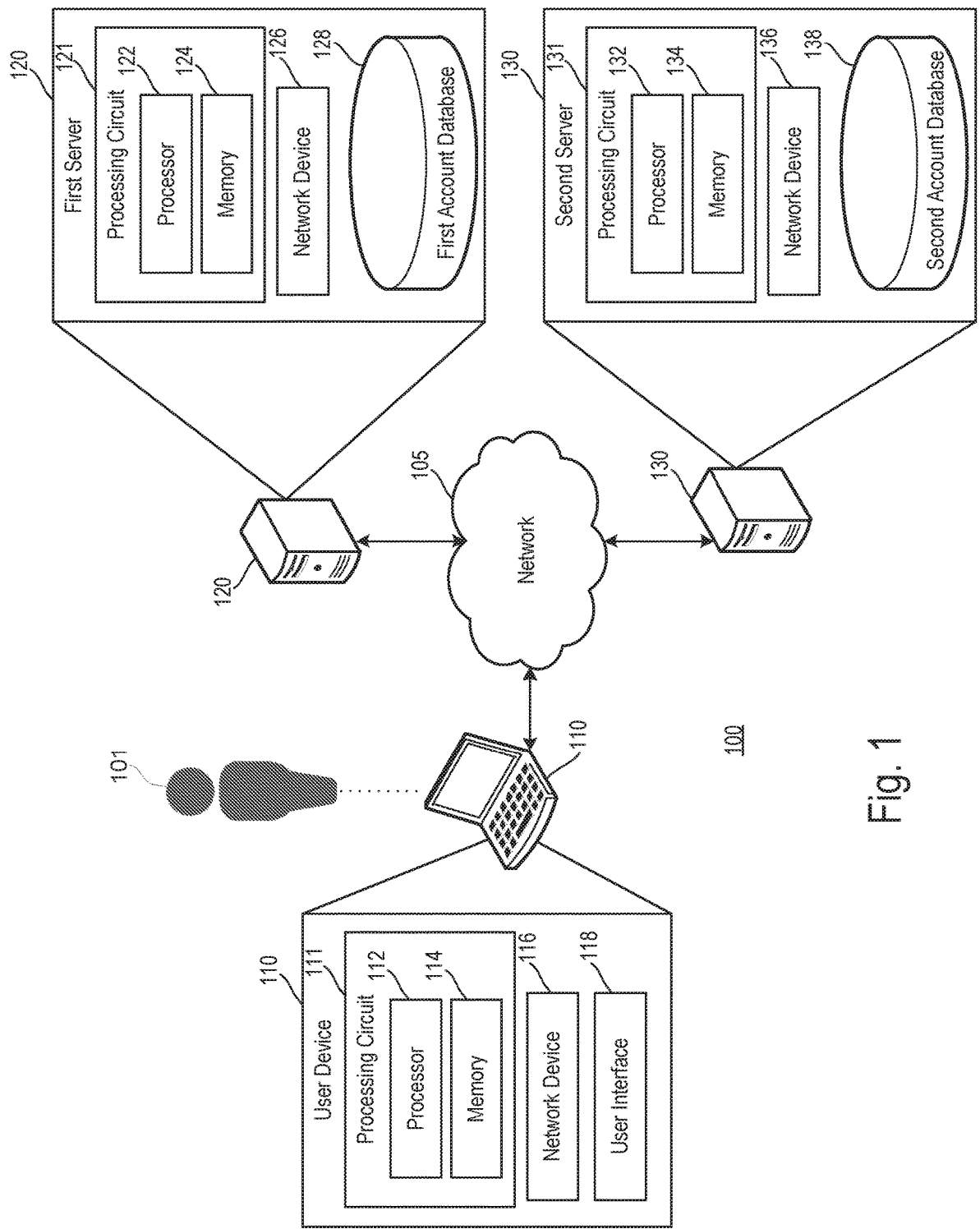
FIG. 1 is a diagram of an example of a system for associating a first account (hosted by a first server) with a second account (hosted by a second server) according to embodiments of the present disclosure.

FIG. 1 is a diagram of an example of a system 100 for associating a first account (hosted by a first server 120) with a second account (hosted by a second server 130) according to some arrangements. Referring to FIG. 1, a user 101 is an entity that employs or otherwise benefits from services provided by both the first server 120 and the second server 130. In particular, the user 101 has registered the first account with the first server 120 and the second account with the second server 130. In other words, the user 101 is the account holder of the first account and the second account. The user 101 maintains a set of login credentials (referred to herein as first login credentials) to access the first account. The first server 120 provides services to the user 101 commensurate with a scope defined by the first account. The user 101 maintains a separate set of login credentials (referred to herein as second login credentials) to access the second account. The second server 130 provides services to the user 101 commensurate with a scope defined by the second account. The user 101 can be any entity such as but not limited to, an individual, a plurality of individuals, a company, and the like.

A network 105 is structured to permit the exchange of data, values, instructions, messages, and the like among a user device 110, the first server 120, and the second server 130. The network 105 can be any suitable Local Area Network (LAN) or Wide Area Network (WAN). For example, the network 105 can be supported by Frequency Division Multiple Access (FDMA), Time Division Multiple Access (TDMA), Synchronous Optical Network (SONET), Dense Wavelength Division Multiplexing (DWDM), Optical Transport Network (OTN), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like.

As shown, the user 101 operates or is associated with the user device 110. In some arrangements, the user device 110 includes at least a processing circuit 111, a network device 116, and a user interface 118. In some arrangements, the user device 110 is a desktop computer, mainframe computer, laptop computer, pad device, smart phone device or the like, configured with hardware and software to perform operations described herein. For example, the user device 110 can be a typical desktop PC or Apple™ computer device, having suitable processing capabilities, memory, user interface (e.g., display and input) capabilities, and communication capabilities, when configured with suitable application software (or other software) to perform operations described herein. Thus, particular arrangements are implemented, using processor devices that are often already present in many business and organization environments, by configuring such devices with suitable software processes described herein. Accordingly, such arrangements can be implemented with minimal additional hardware costs. However, other arrangements of the user device 110 include to dedicated device hardware specifically configured for performing operations described herein.

The processing circuit 111 has a processor 112 and memory 114. The processor 112 is implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 114 is implemented with a Random Access Memory (RAM), Read-Only Memory (ROM), Non-Volatile RAM (NVRAM), flash memory, hard disk storage, or other suitable data storage units. The memory 114 stores data and/or computer code for facilitating the various processes executed by the processor 112. Moreover, the memory 114 is or includes tangible, non-transient volatile memory or non-volatile memory. Accordingly, the memory 114 includes database components, object code components, script components, or any other type of information structure for supporting the various activities and information structures described herein.

The network interface 116 is configured for and structured to establish communication with one or more of the first server 120 and the second server 130 via the network 105. The network interface 116 includes hardware and software for achieving such. In some implementations, the network interface 116 includes a cellular transceiver (configured for cellular standards), a local wireless network transceiver (for 802.11X, ZigBee, Bluetooth, Wi-Fi, or the like), a wired network interface, a combination thereof (e.g., both a cellular transceiver and a Bluetooth transceiver), and/or the like.

The user interface 118 is configured to receive user input from and provide information to the user 101. In this regard, the user interface 118 is structured to exchange data, communications, instructions, etc. with an input/output component of the user device 110. Accordingly, in some arrangements, the user interface 118 includes an input/output device such as but not limited to, a display device, touchscreen, keyboard, microphone, and/or the like. In some arrangements, the user interface 118 includes communication circuitry for facilitating the exchange of data, values, messages, and the like between the input/output device and the components of the user device 110. In some arrangements, the user interface 118 includes machine-readable media for facilitating the exchange of information between the input/output device and the components of the user device 110. In some arrangements, the user interface 118 includes any combination of hardware components (e.g., a touchscreen), communication circuitry, and machine-readable media.

In some arrangements, the first server 120 includes at least a processing circuit 121, a network device 126, and a first account database 128. In some arrangements, the first server 120 is a suitable processor device configured with hardware and software to perform operations described herein. Particular arrangements can be implemented, using processor devices that are often already present in many business and organization environments, by configuring such devices with suitable software processes. Accordingly, such arrangements can be implemented with minimal additional hardware costs. However, other arrangements of the first server 120 include dedicated device hardware specifically configured for performing operations described herein.

The processing circuit 121 includes a processor 122 and memory 124. The processor 122 is implemented with a general-purpose processor, an ASIC, one or more FPGAs, a DSP, a group of processing components, or other suitable electronic processing components. The memory 124 is implemented with a RAM, ROM, NVRAM, flash memory, hard disk storage, or other suitable data storage units. The memory 124 stores data and/or computer codes for facilitating the various processes executed by the processor 122. Moreover, the memory 124 is or includes tangible, non-transient volatile memory or non-volatile memory. Accordingly, the memory 124 includes database components, object code components, script components, or any other type of information structure for supporting the various activities and information structures described herein.

The network interface 126 is configured for and structured to establish communication with the user device 110 and the second server 130 via the network 105. The network interface 126 includes hardware and software for achieving such. In some implementations, the network interface 126 includes a cellular transceiver (configured for cellular standards), a local wireless network transceiver (for 802.11X, ZigBee, Bluetooth, Wi-Fi, or the like), a wired network interface, a combination thereof (e.g., both a cellular transceiver and a Bluetooth transceiver), and/or the like.

The first account database 128 is a memory device having data structures implemented to organize and store account information of users who use the services provided by the first server 120. The first account database 128 stores at least the first login credentials of the user 101 for authenticating the user 101. Additionally, the first account database 128 can store account information relative to the first account of the user 101, including a scope of service commensurate with the first account and the first login credentials of the user 101.

In some arrangements, the second server 130 includes at least a processing circuit 131, a network device 136, and a second account database 138. In some arrangements, the second server 130 is a suitable processor device configured with hardware and software to perform operations described herein. Particular arrangements can be implemented, using processor devices that are often already present in many business and organization environments, by configuring such devices with suitable software processes. Accordingly, such arrangements can be implemented with minimal additional hardware costs. However, other arrangements of the second server 130 include dedicated device hardware specifically configured for performing operations described herein.

The processing circuit 131 includes a processor 132 and memory 134. The processor 132 is implemented with a general-purpose processor, an ASIC, one or more FPGAs, a DSP, a group of processing components, or other suitable electronic processing components. The memory 134 is implemented with a RAM, ROM, NVRAM, flash memory, hard disk storage, or other suitable data storage units. The memory 134 stores data and/or computer codes for facilitating the various processes executed by the processor 132. Moreover, the memory 134 is or includes tangible, non-transient volatile memory or non-volatile memory. Accordingly, the memory 134 includes database components, object code components, script components, or any other type of information structure for supporting the various activities and information structures described herein.

The network interface 136 is configured for and structured to establish communication with the user device 110 and the first server 120 via the network 105. The network interface 136 includes hardware and software for achieving such. In some implementations, the network interface 136 includes a cellular transceiver (configured for cellular standards), a local wireless network transceiver (for 802.11X, ZigBee, Bluetooth, Wi-Fi, or the like), a wired network interface, a combination thereof (e.g., both a cellular transceiver and a Bluetooth transceiver), and/or the like.

The second account database 138 is a memory device having data structures implemented to organize and store account information of users who use the services provided by the second server 130. The second account database 138 stores at least the second login credentials of the user 101 for authenticating the user 101. Additional, the second account database 138 can store account information relative to the second account of the user 101, including a scope of service commensurate with the second account and the second login credentials of the user 101.

In some arrangements, the first server 120 and the second server 130 provide different but related services to the user 101. Illustrating with a non-limiting example pertaining to content delivery services, the second server 130 can be a traffic managing server (e.g., a Level 3 ® Intelligent Traffic Manager) that can perform a Domain Name Servers (DNS)-based routing of wide-area traffic to publicly accessible Internet Protocol (IP) applications, websites, or Content Delivery Networks (CDNs) based on policies configured by the user 101 to optimize performance. In other words, the services commensurate with the second account and the second login credentials include CDN services and/or Internet Service Provider (ISP) services for the user 101. Before the association disclosed herein, the user 101 can log into the second account using the second login credentials (via the user interface 118 of the user device 110) by communicating with the second server 130 directly and set/modify policies (via the user interface 118 of the user device 110) to configure the services commensurate with the second account. In some arrangements, the second server 130 is a remote server that is relatively remote to the user device 110.

The first server 120 is a reporting server (e.g., a Level 3 ® Media portal) that can provide to the user 101 reporting, monitoring, and management capabilities with respect to the services provided by the second server 130. In other words, the services commensurate with the first account and the first account login credentials include analytic services pertaining to the services commensurate with the second account and the second login credentials. The user 101 can log into the first account using the first login credentials (via the user interface 118 of the user device 110) by communicating with the first server 120 directly and review and monitor (via the user interface 118 of the user device 110) the analytic reports related to the services commensurate with the second account. In some arrangements, the first server 120 is a local server that is relatively local to the user device 110. That is, the first server 120 is closer to the user device 110 geographically than the second server 130 is to the user device 110.

While one first server 120 is shown, one of ordinary skill in the art can appreciate that multiples servers (each of which can be a server such as but not limited to, the first server 120) can form a network of servers (e.g., a reporting server network) to serve the user 101 and/or other users, for example, based on geographical locations, traffic balancing, availability, and the like. Similarly, while one second server 130 is shown, one of ordinary skill in the art can appreciate that multiples servers (each of which can be a server such as but not limited to, the second server 130) can form a network of servers (e.g., a traffic managing server network) to serve the user 101 and/or other users, for example, based on geographical locations, traffic balancing, availability, and the like.

Figure 2:
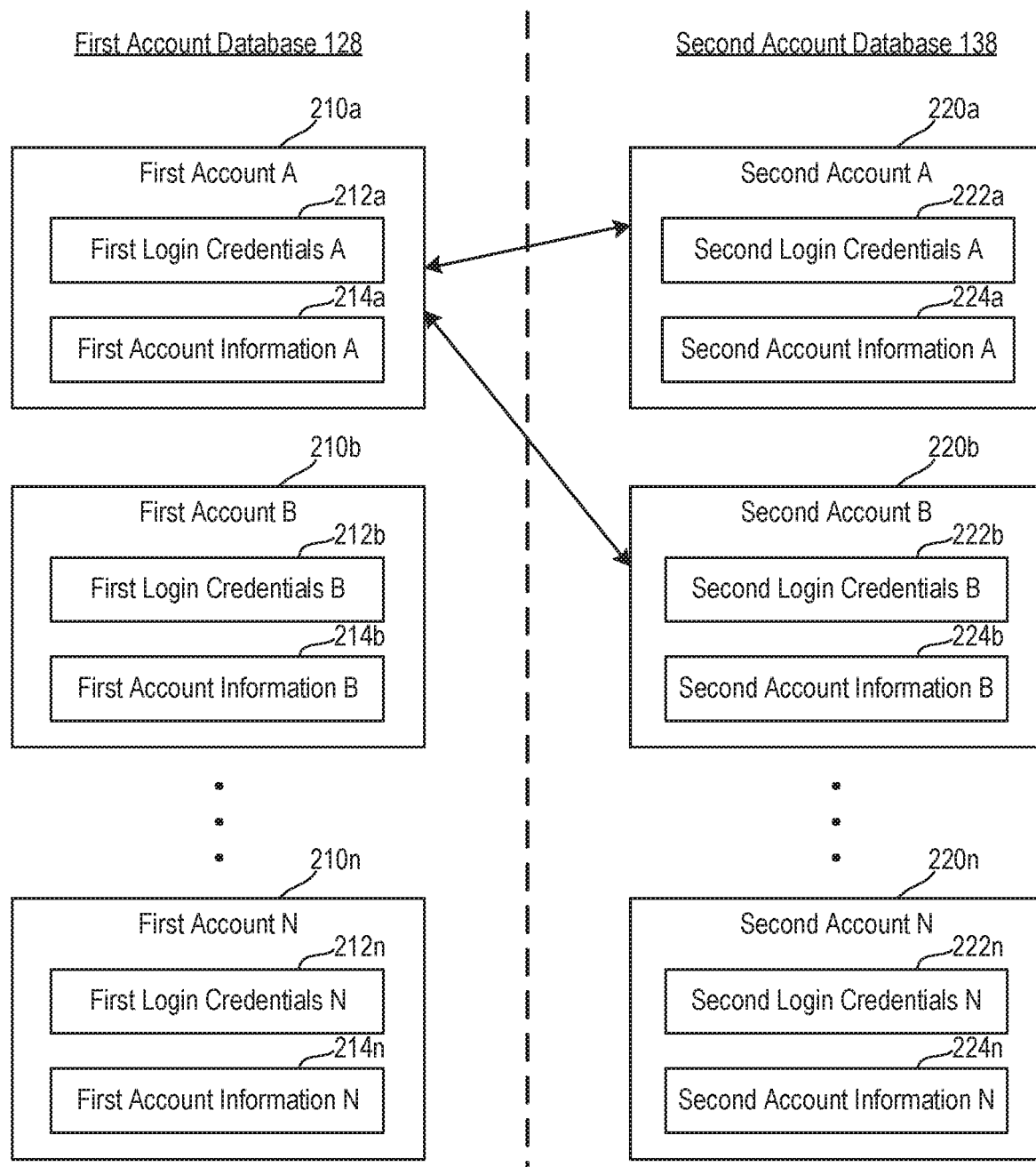
FIG. 2 is a diagram that illustrates associating a first account with one or more second accounts according to embodiments of the present disclosure.

FIG. 2 is a diagram that illustrates associating a first account (e.g., a first account A 210*a*) with one or more second accounts (e.g., a second account A 220*a* and a second account B 220*b*) according to some arrangements. Referring to FIGS. 1-2, the first account database 128 of the first server 120 stores information relative to the first account A 210*a*, a first account B 210*b*, . . . , a first account N 210*n*. Each of the accounts 210*a*-210*n* is associated with a user. For example, the first account A 210*a* is associated with the user 101. The information relative to the first account A 210*a* includes first login credentials A 212*a* and first account information A 214*a*. Response to determining that the first login credentials received via the network 105 from the user device 110 is the same as the first login credentials A 212*a*, the user device 110 is authenticated. The first account information A 214*a* includes information concerning the scope of service commensurate with the first account A 210*a*. The information relative to other first accounts (e.g., the first account B 210*b*, . . . , and the first account N 210*n*)

may include credentials (e.g., first login credentials B 212b, ..., and first login credentials N 212n) and information (e.g., first account information B 214b, ..., and first account information N 214n) associated with other users.

The second account database 138 of the second server 130 stores information relative to the second account A 220a, the second account B 220b, ..., a second account N 220n. Each of the accounts 220a-220n is associated with a user. For example, the second account A 220a and the second account B 220b are associated with the user 101. The information relative to the second account A 220a includes second login credentials A 222a and second account information A 224a. The second login credentials A 222a are used for authenticating the user device 110. The second account information A 224a includes information concerning the scope of service commensurate with the second account A 220a. Illustrating with a non-limiting example, the second account information A 224a includes policy information set by the user 101, where the policy information configures the CDN services. The information relative to the second account B 220b includes second login credentials B 222b and second account information B 224b. The second login credentials B 222b are used for authenticating the user device 110. The second account information B 224b includes information concerning the scope of service commensurate with the second account B 220b. Illustrating with a non-limiting example, the second account information B 224b includes policy information set by the user 101, where the policy information configures the CDN services.

In some arrangements, the scope of services commensurate with the second account A 220a and the scope services commensurate with the second account B 220b are separate and do not overlap. Illustrating with a non-limiting example in that regard, the scope of services commensurate with the second account A 220a (e.g., the second account information A 224a) corresponds to providing CDN services for customers of the user 101 located in a first geographical area. The scope of services commensurate with the second account B 220b (e.g., the second account information B 224b) corresponds to providing CDN services for customers of the user 101 located in a second geographical area separate from the first geographical area. Illustrating with another non-limiting example in that regard, the scope of services commensurate with the second account A 220a (e.g., the second account information A 224a) may correspond to providing CDN services for a first content source of the user 101. The scope of services commensurate with the second account B 220b (e.g., the second account information B 224b) may correspond to providing CDN services for a second content source of the user 101, where the first and second content sources are different. The information relative to other second accounts (e.g., the second account N 220n) may include credentials (e.g., second login credentials N 222n) and information (e.g., second account information N 224n) associated with another user.

The first server 120 and the second server 130 can associate a first account (e.g., the first account A 210a) with one or more second accounts (e.g., the second account A 220a and the second account B 220b). While the arrangements described with respect to FIGS. 3A-4C relate to associating the first account A 210a with one second account (e.g., the second account A 220a), one of ordinary skill in the art can appreciate that at least one other second account (e.g., the second account B 220b) can be associated with the first account A 210a in a similar manner.

Figure 3A:
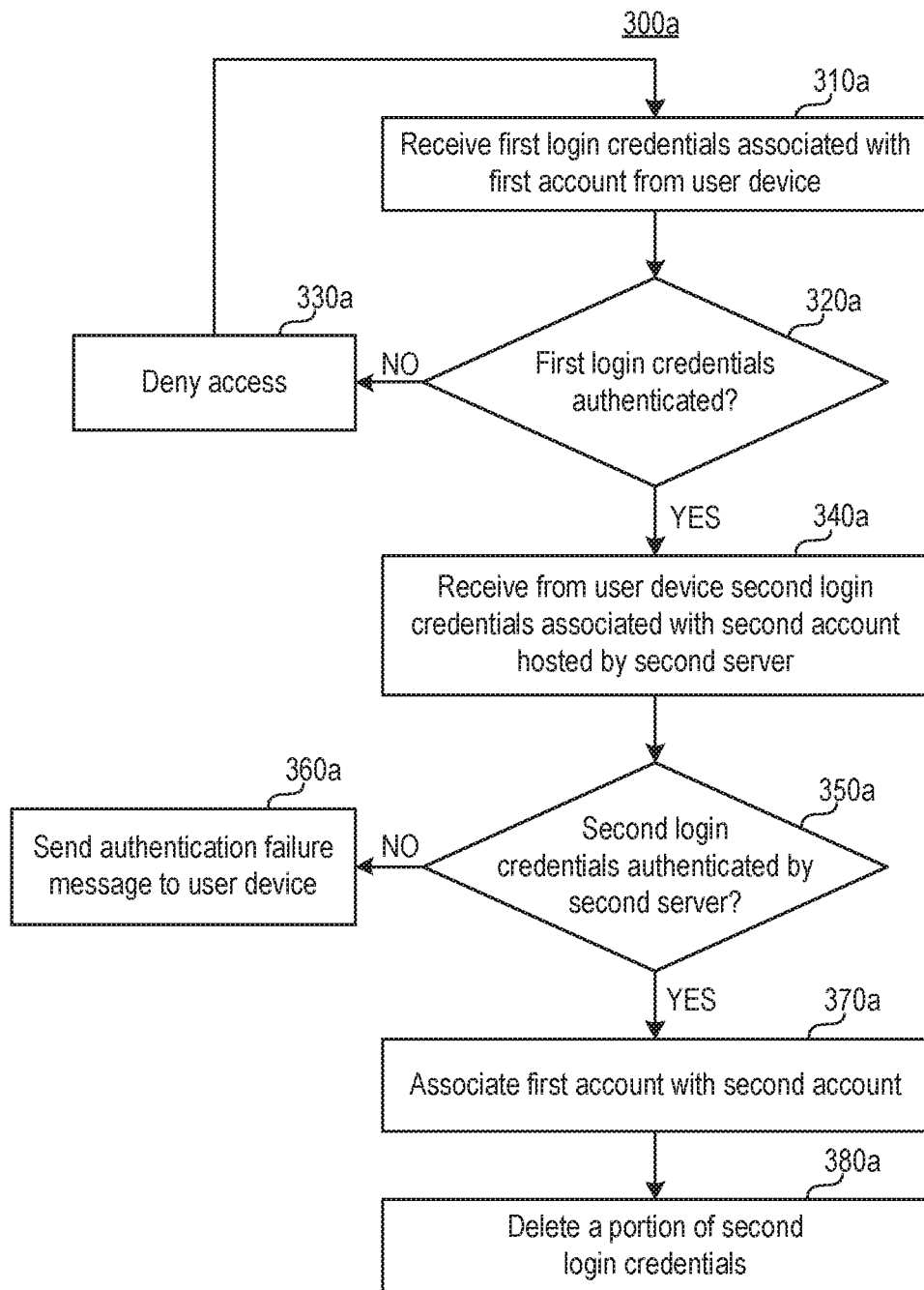
FIG. 3A is a flow diagram illustrating a method for the first server (FIG. 1) to associate a first account hosted by the first server and a second account hosted by the second server (FIG. 1) according to embodiments of the present disclosure.

FIG. 3A is a flow diagram illustrating a method 300a for the first server 120 (FIG. 1) to associate a first account (e.g., the first account A 210a of FIG. 2) hosted by the first server 120 and a second account (e.g., the second account A 220a of FIG. 2) hosted by the second server 130 (FIG. 1) according to some arrangements. Referring to FIGS. 1-3A, the method 300a allows the user device 110 to register the second account A 220a with the first server 120 such that the first server 120 has knowledge of the relationship between the first account A 210a and the second account A 220a.

At 310a, the first server 120 receives first login credentials associated with the first account A 210a from the user device 110. In particular, the first server 120 provides a web-based interface or a web-based application accessible by the network device 116 of the user device 110. Illustrating with a non-limiting example, the web-based interface or the web-based application includes a login page or a login window displayed to the user 101 via an output component of the user interface 118. The user 101 can input the first login credentials (e.g., a username, a password, biometrics, a combination thereof, or the like) using the web-based interface or the web-based application, via an input component of the user interface 118. The user device 110 sends the first login credentials to the first server 120 via the network 105.

At 320a, the first server 120 determines whether the first login credentials are authenticated. For example, the processing circuit 121 compares the first login credentials received from the user device 110 to the login credentials 212a-212n stored in the first account database 128 to determine whether a match exists. Responsive to determining that the first login credentials received from the user device 110 are not authenticated (320a:NO), the first server 120 denies the user device 110 access at 330a. For example, the first server 120 may send an access denied message to the user device 110 to be displayed to the user 101. Thereafter, the first server 120 may receive additional attempts of authentication at block 310a.

On the other hand, after determining that the first login credentials received from the user device 110 are authenticated (320a:YES), the first server 120 receives from the user device 110 second login credentials associated with the second account A 220a that is hosted by the second server 130. In some examples, the second login credentials can include an account identifier that identifies the second account A 220a. The account identifier may be a username, an account name, an account number, a combination thereof, or the like.

In some arrangements, the first server 120 provides a web-based interface or a web-based application accessible by the network device 116 of the user device 110 to receive user input corresponding to the second login credentials. Illustrating with a non-limiting example, the web-based interface or the web-based application includes a page or a window displayed to the user 101 via an output device of the user interface 118. The user 101 can input the second login credentials (e.g., a username, a password, biometrics, a combination thereof, or the like) using the web-based interface or the web-based application, via an input component of the user interface 118. The user device 110 sends the second login credentials to the first server 120 via the network 105.

Figure 5A:
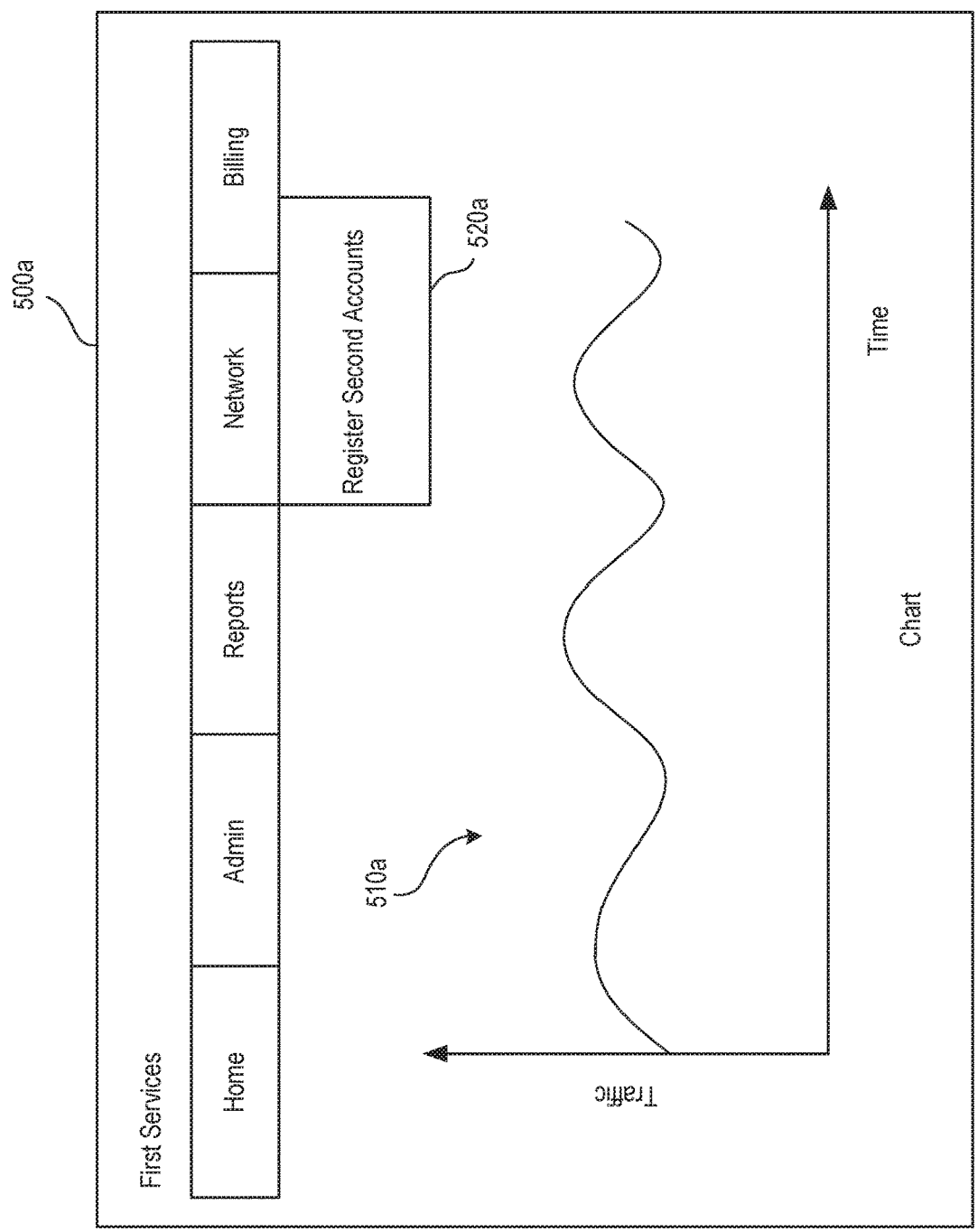
FIGS. 5A and 5B are interface display diagrams illustrating interactive interfaces for receiving user input in connection with registering a second account hosted by the second server (FIG. 1) according to embodiments of the present disclosure.
Figure 5B:
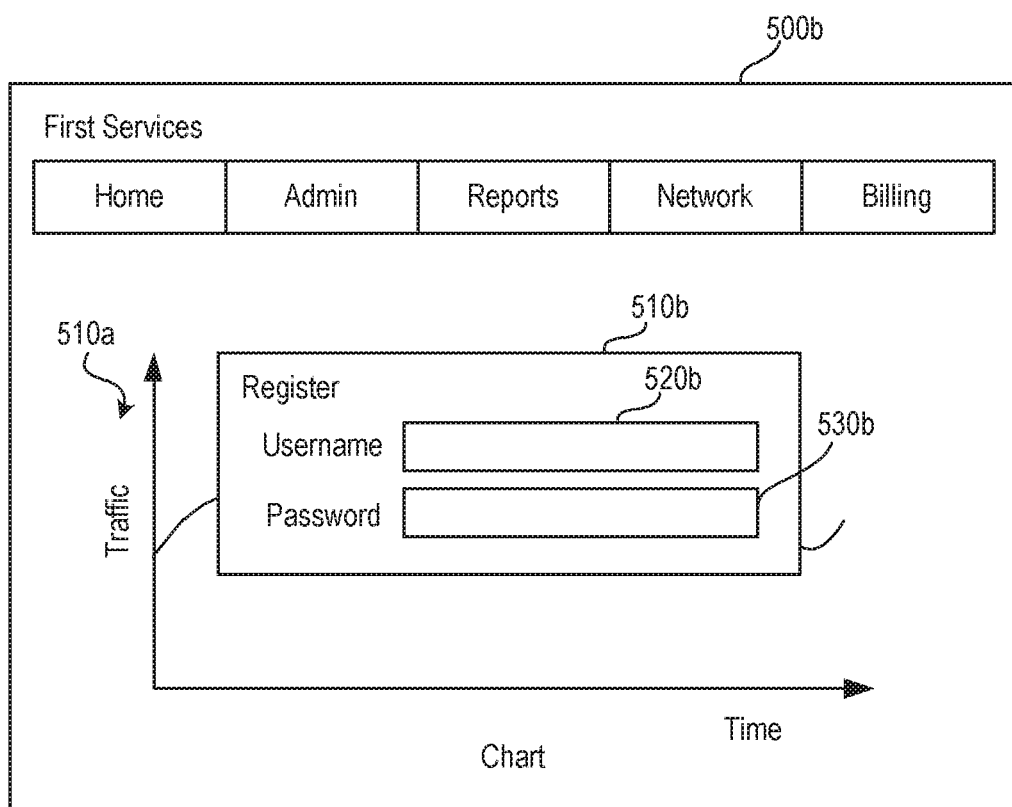

FIGS. 5A and 5B illustrate non-limiting examples of a page displayed on the user device 110 for receiving user input corresponding to the second login credentials. FIGS. 5A and 5B are interface display diagrams illustrating interactive interfaces 500a and 500b, respectively, for receiving user input in connection with registering a second account (e.g., the second account A 220a of FIG. 2) hosted by the second server 130 (FIG. 1) with the first server 120 according to some arrangements. Referring to FIGS. 1-3A, 5A, and 5B, the interactive interfaces 500a and 500b are provided by the first server 120 to be displayed by an output component of the user interface 118. Each of the interactive interfaces 500a and 500b displays the first account information A 214a, which corresponds to the services commensurate with the first account A 210a. Illustrating with a non-limiting example, the first account information A 214a includes an analytic diagram 510a. In some instances, the analytic diagram 510a may be plotted using data (e.g., the second account information A 224a) associated with services commensurate with the second account A 220a.

The interactive interface 500a further includes a user interactive element 520a corresponding to initiating registration of at least one account (e.g., the second account A 220a) stored in the second account database 138. In the scenario in which two or more second servers (each of which is a sever such as but not limited to, the second server 130) store different accounts, the interactive interface 500a can display a server selection window (not shown) to allow the user 101 to select an appropriate second server on which the second account A 220a is hosted.

Responsive to the user 101 selecting the user interactive element 520a, a window 510b may be displayed to receive the user input relative to the second login credentials. The window 510b may include a first field 520b for receiving a username and a second field 530b for receiving a password. Other manners for receiving user input corresponding to the second login credentials (e.g., using biometric sensors) can be implemented.

At 350a, the first server 120 determines whether the second login credentials received from the user device 110 is authenticated by the second server 130. In some arrangements, responsive to receiving the second login credentials from the user device 110, the first server 120 sends the second login credentials to the second server 130 to be authenticated by the second server 130. The processing circuit 131 compares the second login credentials received from the first server 120 to the login credentials 222a-222n stored in the second account database 138 to determine whether a match exists. If a match exists, the first server 120 receives an authentication success message from the second server 130. On the other hand, if a match does not exist, the first server 120 receives an authentication failure message from the second server 130.

Responsive to determining that the second login credentials are not authenticated (350a:NO), the first server 120 sends an authentication failure message to the user device 110 at 360a. On the other hand, responsive to determining that the second login credentials are authenticated (350a: YES), the first server 120 associates the first account A 210a with the second account A 220a. In some arrangements, associating the first account A 210 with the second account A 220a includes storing the account identifier of the authenticated second login credentials in the first account database 128. In some arrangements, associating the first account A 210 with the second account A 220a further includes storing mapping information that maps the first account A 210a to the account identifier in the first account database 128. In particular, the first account database 128 may store the account identifier that identifies the second account A 220a together with the first login credentials A 212a and the first account information A 214a. Accordingly, the first account A 210a is flagged to indicate that an account (e.g., the second account A 220a) from the second account database 138 is associated with the first account A 210a.

At 380a, the first server 120 may delete a portion of the second login credentials receive from the user device 110. In some examples, the portion of the second login credentials deleted is a password or biometric information. In some examples, all of the second login credentials received from the user device 110 is deleted with the exception of the account identifier. Such portion of the second login credentials is not stored because subsequent communication with the second server 130 related to the second account A 220a is to be executed using administrative credentials associated with the first sever 120. Such mechanism improve account security.

Figure 3B:
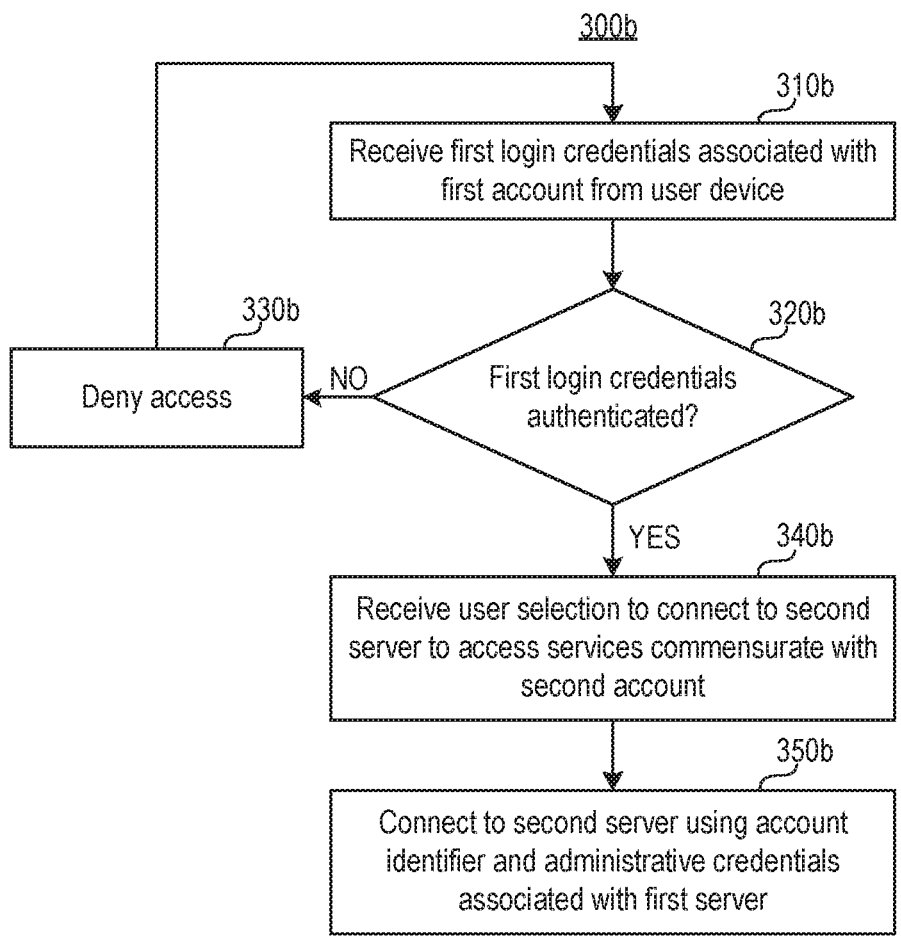
FIG. 3B is a flow diagram illustrating a method for the first server (FIG. 1) to log in a second account hosted by the second server (FIG. 1) according to embodiments of the present disclosure.

FIG. 3B is a flow diagram illustrating a method 300b for the first server 120 (FIG. 1) to log in a second account (e.g., the second account A 220a of FIG. 2) hosted by the second server 130 (FIG. 1) according to some arrangements. Referring to FIGS. 1-3B, after associating the first account A 210a and the second account A 220a, the user 101 can log into the second account A 220a indirectly through the first server 120 instead of directly through the second server 130.

At 310b, the first server 120 receives first login credentials associated with the first account A 210a from the user device 110, in a manner similar to described with respect to 310a. At 320a, the first server 120 determines whether the first login credentials received from the user device are authenticated, in a manner similar to described with respect to 320a. Responsive to determining that the first login credentials received from the user device 110 are not authenticated (320b:NO), the first server 120 denies the user device 110 access at 330b, in a manner similar to described with respect to 330a.

On the other hand, after determining that the first login credentials received from the user device are authenticated (320b:YES), the first server 120 receives user selection to connect to the second server 130 to access services commensurate with the second account A 220a. In particular, the first server 120 provides a web-based interface or a web-based application accessible by the network device 116 of the user device 110 for receiving the user selection.

Figure 5C:
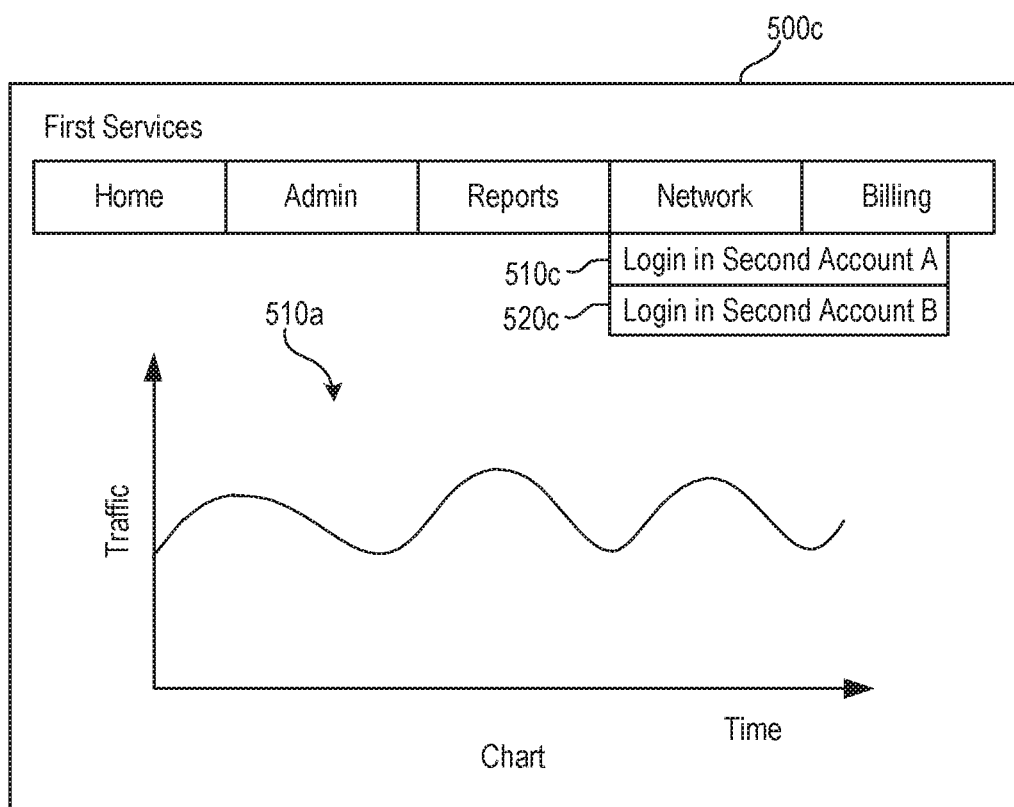
FIG. 5C is an interface display diagram illustrating an interactive interface for receiving user selection to connect to the second server (FIG. 1) to access services commensurate with a second account hosted by the second server (FIG. 1) according to embodiments of the present disclosure.

FIG. 5C illustrates a non-limiting example of a page displayed on the user device 110 for receiving user selection corresponding to connecting to the second server 130 to access the services commensurate with the second account A 220a. FIG. 5C is an interface display diagram illustrating an interactive interface 500c for receiving user selection to connect to the second server 130 (FIG. 1) to access services commensurate with a second account (e.g., the second account A 220a of FIG. 2) hosted by the second server 130 (FIG. 1) according to some arrangements.

Referring to FIGS. 1-3B and 5A-5C, the interactive interface 500c is provided by the first server 120 to be displayed by an output component of the user interface 118. The interactive interface 500c displays the first account information A 214a, which corresponds to the services commensurate with the first account A 210a. Illustrating with a non-limiting example, the first account information A 214a comprise the analytic diagram 510a. In addition, the interactive interface 500c displays user interactive elements 510c and 520c for connecting to the second server 130. The user interactive element 510c corresponds to connecting to the second server 130 for accessing services commensurate with the second account A 220a. The user interactive element 520c corresponds to connecting to the second server 130 for accessing services commensurate with the second account B 220b, which may be registered by the first server 120 in a manner similar to described with respect to the second account A 220a. In particular, an account identifier identifying the second account B 220*b* is also stored and mapped to the first account A 210*a*. On the other hand, in the event that only one second account (e.g., only the second account A 220*a*) is associated with the first account A 210, selecting an user interactive element indicating connecting to the second server 130 (and not to any particular account) can automatically trigger logging in the second account A 220*a*.

At 350*b*, the first server 120 connects to the second server 130 using the account identifier and administrative credentials associated with the first server 120. Given that the account identifier (e.g., the username, account name, account number, or the like) is stored and mapped to the first account A 210*a*, the first server 120 uses the account identifier to identify the second account A 220*a* when communicating with the second server 130. The first sever 120 uses the administrative credentials instead of using the password, biometric information, or other mechanisms of authentication that involve user input. Thus, the first server 120 can allow the user 101 to access the services commensurate with the second account 220*a* without prompting the user device 110 for the second login credentials. The request from the user device 110 is tunneled to the second server 130 by the first server 120.

In other words, responsive to receiving user selection selecting the user interactive element 510*c*, the first server 120 automatically sends to the second server 130 an authentication request. The authentication request includes the account identifier (identifying the second account A 220*a*) and administrative credentials associated with the first server 120.

After authentication by the second server 130 using the administrative credentials of the first server 120, services commensurate with the second account A 220*a* can be tunneled to the user device 110 by a web-based interface or a web-based application provided by the first server 120 in some arrangements. In other words, the first server 120 can relay data (e.g., user requests and user inputs) originating from the user device 110 to the second server 130. The first server 120 can also relay data (e.g., the second account information A 224*a*) originating from the second server 130 to the user device 110. In other arrangements, after authentication by the second server 130 using the administrative credentials of the first server 120, services commensurate with the second account A 220*a* can be directly provided by a web-based interface or a web-based application provided by the second server 130.

Figure 3C:
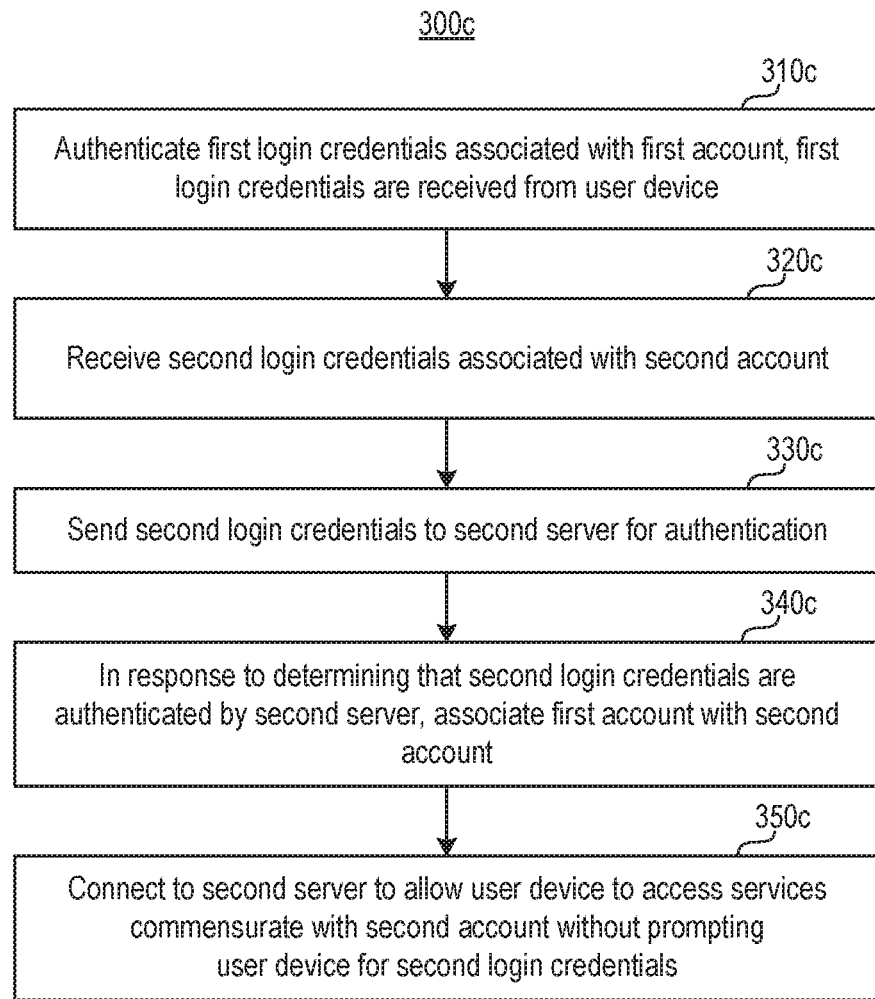
FIG. 3C is a flow diagram illustrating a method for the first server 120 (FIG. 1) to associate a first account hosted by the first server 120 and a second account hosted by the second server 130 (FIG. 1) according to embodiments of the present disclosure.

FIG. 3C is a flow diagram illustrating a method 300*c* for the first server 120 (FIG. 1) to associate a first account (e.g., the first account A 210*a* of FIG. 2) hosted by the first server 120 and a second account (e.g., the second account A 220*a* of FIG. 2) hosted by the second server 130 (FIG. 1) according to some arrangements. Referring to FIGS. 1-3C and 5A-5C, each of blocks 310*c*-350*c* corresponds to one or more of blocks 310*a*-380*a* and/or 310*b*-350*b*.

At 310*c*, the first server 120 authenticates first login credentials associated with the first account A 210*a*. The first login credentials are received from the user device 110. At 320*c*, the first server 120 receives second login credentials associated with the second account A 220*a* from the user device 110. The first server 120 receives the second login credentials after the first login credentials are authenticated by the first server 120. Illustrating with a non-limiting example, the first server 120 can receive second login credentials associated with the second account A 220*a* from the user device 110 via the interactive interfaces 500*a* and 500*b*.

At 330*c*, the first server 120 sends the second login credentials to the second server 130 for authentication. If the second server 130 authenticates the second login credentials, the first server 120 receives an authentication success message from the second server 130. In response to determining that the second login credentials are authenticated by the second server 130, the first server 120 associates the first account A 210*a* with the second account A 220*a* at 340*c*. In particular, the second login credentials include the account identifier that identifies the second account A 210*a*. Associating the first account A 210*a* with the second account A 220*a* includes storing the account identifier and storing mapping information that maps the first account A 210*a* to the account identifier.

At 350*c*, the first server 120 connects to the second server 130 to allow the user device 110 to access the services commensurate with the second account A 220*a* without prompting the user device 110 for the second login credentials. In some arrangements, the first server 120 requests services commensurate with the second account A 220*a* on behalf of the user device 110 by logging into the second account A 220*a* using administrative credentials associated with the first server 120. In some arrangements, the first server 120 sends to the second server 130 an authentication request that includes the account identifier and administrative credentials associated with the first sever 120. Thus, the first server 120 does not need to prompt the user device 110 for the second login credentials for authentication.

Figure 4A:
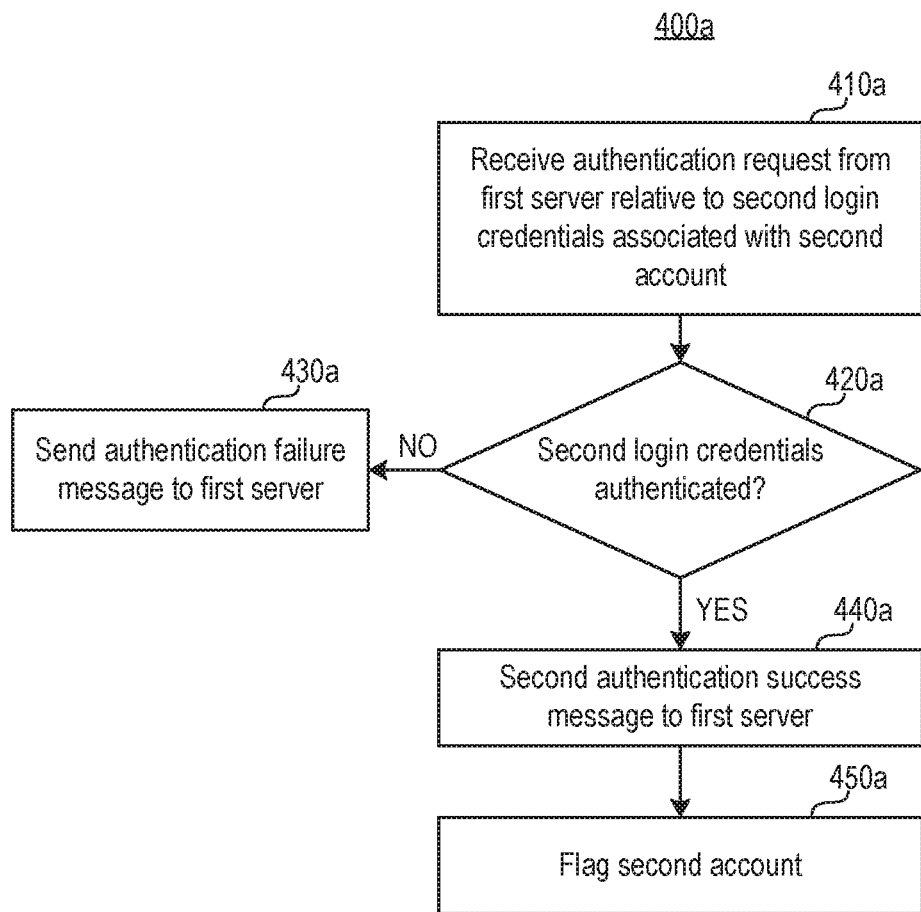
FIG. 4A is a flow diagram illustrating a method for the second server 130 (FIG. 1) to associate a first account hosted by the first server 120 and a second account hosted by the second server 130 (FIG. 1) according to embodiments of the present disclosure.

FIG. 4A is a flow diagram illustrating a method 400*a* for the second server 130 (FIG. 1) to associate a first account (e.g., the first account A 210*a* of FIG. 2) hosted by the first server 120 with a second account (e.g., the second account A 220*a* of FIG. 2) hosted by the second server 130 (FIG. 1) according to some arrangements. Referring to FIGS. 1-4A, the second server 130 receives an authentication request from the first server 120 relative to the second login credentials associated with the second account A 220*a*, at 410*a*. The authentication request includes second login credentials that the first server 120 receives from the user device 110.

At 420*a*, the second server 130 determines whether the second login credentials received from the first server 120 are authenticated. For example, the processing circuit 131 compares the second login credentials received from the first server 120 to the login credentials 222*a*-222*n* stored in the second account database 138 to determine whether a match exists. If a match exists, the second server 130 authenticates the second login credentials. On the other hand, if a match does not exist, the second server 130 fails to authenticate the second login credentials.

Thus, in response to determining that the second login credentials are not authenticated (420*a*:NO), the second server 130 sends an authentication failure message to the first server 120 at 430*a*. On the other hand, in response to determining that the second login credentials are authenticated (420*a*:YES), the second server 130 sends an authentication success message to the first server 120 at 440*a*. The second server 130 flags the second account A 220*a* at 450*a*. Block 450*a* can be executed responsive to 420*a*:YES or responsive to completion of block 440*a*.

Flagging the second account A 220*a* includes, for example, storing an indicator with the second account A 220*a* in the second account database 138, toggling a value associated with the second account A 220*a*, or the like, to indicate that the second account A 220*a* is associated with an account (e.g., the first account A 210*a*) hosted by the first account database 128. Once flagged, the user device 110 can no longer directly access the second account A 220*a* by providing the second login credentials (associated with the user 101) to be authenticated by the second server 130. In other words, once flagged, the second server 130 does not accept direct login attempts from the user device 110 for the second account A 220a.

Figure 4B:
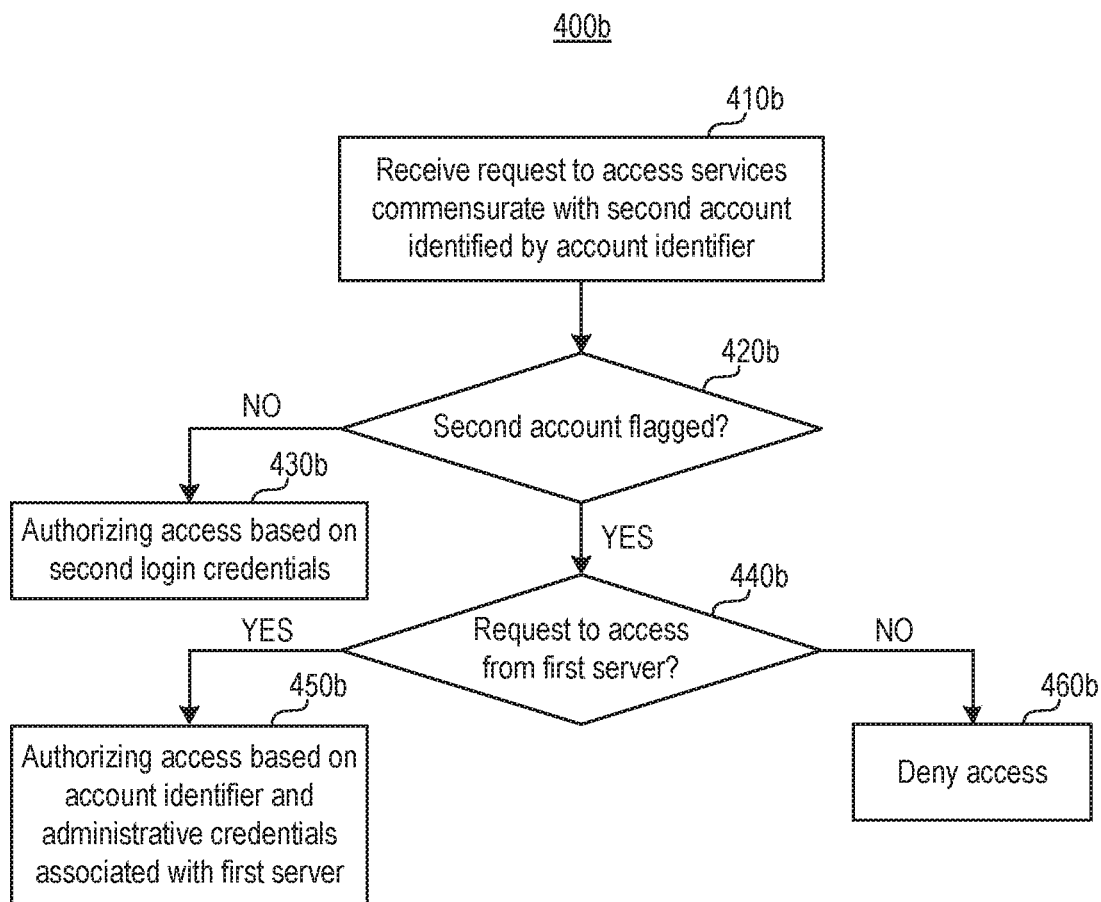
FIG. 4B is a flow diagram illustrating a method for the second server (FIG. 1) to facilitate the first server (FIG. 1) to log in a second account hosted by the second server according to embodiments of the present disclosure.

FIG. 4B is a flow diagram illustrating a method 400b for the second server 130 (FIG. 1) to facilitate the first server 120 (FIG. 1) to log in a second account (e.g., the second account A 220a of FIG. 2) hosted by the second server 130 according to some arrangements. Referring to FIGS. 1-4B, the second server 130 receives a request to access services commensurate with the second account A 220a identified by the account identifier at 410b. The second server 130 identifies the second account A 220a using the account identifier that is included in the request.

At 420b, the second server 130 determines whether the second account A 220a has been flagged. For example, the second server 130 determines whether there is a flag, an indicator, or a toggled value that indicates that the second account A 220a is associated with an account hosted by the first server 120. In response to determining that the second account A 220a is not flagged (420b:NO), the second server 130 authorizes access to the second account A 220a based on the second login credentials A 222a. That is, the second server 130 allows direct login from the user device 110, on which the user 101 inputs second login credentials that is the same as the second login credentials A 222a stored in the second account database 138.

On the other hand, in response to determining that the second account A 220a is flagged (420b:YES), the second server 130 determines whether the request to access is from the first server 120. In some arrangements, the second server 130 can determine that the request to access is from the first server 120 in response to determining that the request to access originates from the first server 120 (e.g., an associated address of origin, such as an IP address, is the same as that of the first server 120) at 440b. In some arrangements, the second server 130 can determine that the request to access is from the first server 120 in response to determining that the request to access contains administrative credentials associated with the first server 120 (instead of credentials associated with the user 101, such as the password or biometric information of the user 101).

Responsive to determining that the request to access is not from the first server 120 (440b:NO), the second server 130 denies access at 460b. In other words, unless the request to access contains the administrative credentials associated with the first server 120, the second server 130 denies access, even as the request to access contains second login credentials that are the same as the second login credentials A 222a (e.g., even as the request to access originates from the user device 110).

On the other hand, responsive to determining that the request to access is from the first server 120 (440b:YES), the second server 130 authorizes access to the second account A 220a based on the account identifier and the administrative credentials associated with the first server 120. The second server 130 can provide access to the second account information A 224a directly to the user device 110 by providing a web-based interface or a web-based application in some arrangements. In other arrangements, the second server 130 can provide access to the second account information A 224a indirectly to the user device 110 through the first server 120 in the manner described.

Figure 4C:
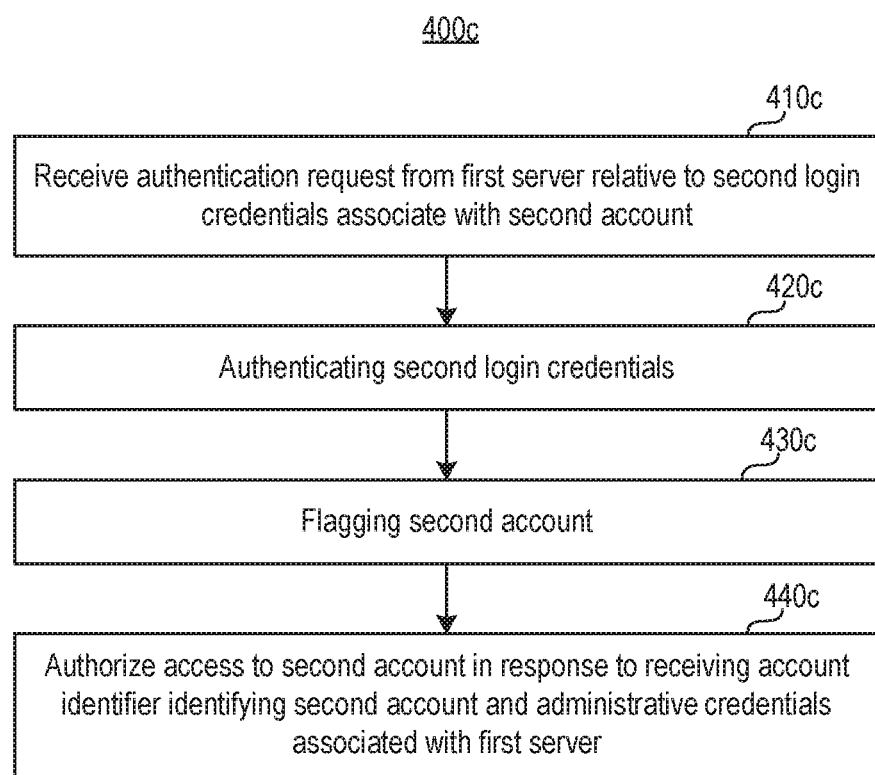
FIG. 4C is a flow diagram illustrating a method for the second server 130 (FIG. 1) to associate a first account hosted by the first server 120 and a second account hosted by the second server 130 (FIG. 1) according to embodiments of the present disclosure.

FIG. 4C is a flow diagram illustrating a method 400c for the second server 130 (FIG. 1) to associate a first account (e.g., the first account A 210a of FIG. 2) hosted by the first server 120 with a second account (e.g., the second account A 220a of FIG. 2) hosted by the second server 130 (FIG. 1) according to some arrangements. Referring to FIGS. 1-4C, each of blocks 410c-440c corresponds to one or more of blocks 410a-450a and/or 410b-460b.

At 410c, the second server 130 receives an authentication request from the first server 120 relative to second login credentials associated with the second account A 220a. The first server 120 received the second login credentials from the user device 110 and relays the second login credentials to the second server 130 for authentication.

At 420c, the second server 130 authenticates the second login credentials with respect to the second account A 220a. In some arrangements, responsive to authenticating the second login credentials, the second server 130 flags the second account A 220a at 430c.

At 440c, the second sever 130 authorizes access to the second account A 220a in response to receiving account identifier identifying the second account A 220a and administrative credentials associated with the first server 120.

In some arrangements, the second server 130 receives a second authentication request from a device other than the first server (without proper administrative credentials associated with the first server 120). In response, the second server 130 denies the second authentication request as the second account A 220a is flagged.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, ASICs, FPGAs, DSPs, or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for associating a first account with a second account, the first account being hosted by a first server, the second account being hosted by a second server, the method comprising:
    receiving, by the second server, an authentication request from the first server relative to second login credentials associated with the second account;
    authenticating, by the second server, the second login credentials;
    flagging, by the second server, the second account; and
    authorizing access, by the second server, to the second account in response to receiving an account identifier identifying the second account and administrator's credentials associated with the first server,
    wherein the access to the second account is authorized to a user device to allow the user device to access services commensurate with the second account, and
    wherein authorizing access to the second account comprises determining that the second account is flagged.

2. The method of claim 1, further comprising:
    receiving, by the second server, a second authentication request from a device other than the first server to access the second account after the second account has been flagged; and
    denying the second authentication request.

3. The method of claim 1, further comprising;
    receiving, by the second server, an authentication request from a user device to access the second account after flagging the second account, wherein the authentication request comprises the second login credentials; and
    denying the authentication request.

4. The method of claim 1, wherein services commensurate with the second account comprise content delivery network (CDN) services for a user of the user device.

5. The method of claim 1, wherein the account identifier is at least one of a username, an account name, or an account number.

6. A second server for associating a first account with a second account, the first account being hosted by a first server, the second account being hosted by the second server, comprising:
  a network device;
  a memory; and
  a processor configured to:
    receive an authentication request from the first server relative to second login credentials associated with the second account;
    authenticate the second login credentials;
    flag the second account; and
    authorize access to the second account in response to receiving an account identifier identifying the second account and administrator's credentials associated with the first server,
    wherein the access to the second account is authorized to a user device to allow the user device to access services commensurate with the second account, and
  wherein authorizing access to the second account comprises determining that the second account is flagged.

7. The second server of claim 6, wherein the processor is further configured to:
  receive a second authentication request from a device other than the first server to access the second account after the second account has been flagged; and
  deny the second authentication request.

8. The second server of claim 6, wherein the processor is further configured to:
  receive an authentication request from a user device to access the second account after flagging the second account, wherein the authentication request comprises the second login credentials; and
  deny the authentication request.

9. The second server of claim 6, wherein services commensurate with the second account comprise content delivery network (CDN) services for a user of the user device.

10. A non-transitory computer-readable medium comprising computer-readable instructions for associating a first account with a second account, the first account being hosted by a first server, the second account being hosted by a second server, when executed, cause a processor of the second server to:
  receive an authentication request from the first server relative to second login credentials associated with the second account;
  authenticate the second login credentials;
  flag the second account; and
  authorize access to the second account in response to receiving an account identifier identifying the second account and administrator's credentials associated with the first server,
  wherein the access to the second account is authorized to a user device to allow the user device to access services commensurate with the second account, and
  wherein authorizing access to the second account comprises determining that the second account is flagged.

11. The non-transitory computer-readable medium of claim 10, wherein the processor is further configured to:
  receive a second authentication request from a device other than the first server to access the second account after the second account has been flagged; and
  deny the second authentication request.

12. The non-transitory computer-readable medium of claim 10, wherein the processor is further configured to:
  receive an authentication request from a user device to access the second account after flagging the second account, wherein the authentication request comprises the second login credentials; and
  deny the authentication request.

13. The non-transitory computer-readable medium of claim 10, wherein services commensurate with the second account comprise content delivery network (CDN) services for a user of the user device.

14. The non-transitory computer-readable medium of claim 10, wherein the account identifier is at least one of a username, an account name, or an account number.

15. A method for associating a first account with a second account, the first account being hosted by a first server, the second account being hosted by a second server, the method comprising:
  receiving, by the second server, an authentication request from the first server relative to second login credentials associated with the second account;
  authenticating, by the second server, the second login credentials;
  flagging, by the second server, the second account;
  authorizing access, by the second server, to the second account in response to receiving an account identifier identifying the second account and administrator's credentials associated with the first server;
  receiving, by the second server, a second authentication request from a device other than the first server to access the second account after the second account has been flagged; and
  denying the second authentication request.

16. The method of claim 15, further comprising:
  receiving, by the second server, an authentication request from a user device to access the second account after flagging the second account, wherein the authentication request comprises the second login credentials; and
  denying the authentication request.

17. The method of claim 15, wherein the access to the second account is authorized to a user device to allow the user device to access services commensurate with the second account.

18. The method of claim 15, wherein authorizing access to the second account comprises determining that the second account is flagged.

19. The method of claim 15, wherein services commensurate with the second account comprise content delivery network (CDN) services for a user of a user device.

* * * * *